United States Patent
Kim

(10) Patent No.: US 12,240,545 B2
(45) Date of Patent: Mar. 4, 2025

(54) APPARATUS AND METHOD OF DIAGNOSING AND CORRECTING STEERING ANGLE OF STEER-BY-WIRE STEERING SYSTEM

(71) Applicant: HYUNDAI MOBIS CO., LTD., Seoul (KR)

(72) Inventor: Dong Hee Kim, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 213 days.

(21) Appl. No.: 18/070,925

(22) Filed: Nov. 29, 2022

(65) Prior Publication Data

US 2023/0391397 A1    Dec. 7, 2023

(30) Foreign Application Priority Data

Jun. 7, 2022    (KR) .................. 10-2022-0068667

(51) Int. Cl.
| | |
|---|---|
| *B62D 6/02* | (2006.01) |
| *B62D 5/04* | (2006.01) |
| *B62D 6/00* | (2006.01) |
| *G01M 17/06* | (2006.01) |

(52) U.S. Cl.
CPC ........... *B62D 6/002* (2013.01); *B62D 5/0481* (2013.01); *G01M 17/06* (2013.01)

(58) Field of Classification Search
CPC .................................................... B62D 6/002
See application file for complete search history.

(56) References Cited

U.S. PATENT DOCUMENTS

| | | | |
|---|---|---|---|
| 2003/0028306 A1* | 2/2003 | Fujimori ................ | B62D 6/002 180/443 |
| 2004/0011586 A1* | 1/2004 | Zhao ..................... | B62D 5/006 180/402 |
| 2014/0008141 A1* | 1/2014 | Kageyama ............... | B60G 3/20 180/400 |
| 2015/0246687 A1* | 9/2015 | Takeda .................. | B62D 15/025 701/41 |
| 2015/0274206 A1* | 10/2015 | Takeda .................. | B62D 6/008 701/41 |
| 2015/0329142 A1* | 11/2015 | Takeda .................. | B62D 6/003 701/41 |
| 2015/0353127 A1* | 12/2015 | Takeda .................. | B62D 6/008 701/41 |
| 2015/0360715 A1* | 12/2015 | Shimizu ............... | B62D 5/0484 701/43 |
| 2016/0114832 A1* | 4/2016 | Taniguchi ................ | B62D 6/04 701/41 |
| 2017/0247048 A1* | 8/2017 | Namikawa ............ | B62D 6/006 |
| 2022/0289270 A1* | 9/2022 | Nichols ............... | B62D 15/0235 |
| 2022/0315103 A1* | 10/2022 | Mori ..................... | B62D 5/0463 |

* cited by examiner

*Primary Examiner* — Long T Tran
(74) *Attorney, Agent, or Firm* — NSIP Law

(57) ABSTRACT

A steering angle diagnosis and correction apparatus and method in a steer-by-wire (SBW) steering system including a sensor unit configured to detect information for diagnosing a steering angle alignment error between a steer-side upper system and a wheel-side lower system in the SBW steering system through a plurality of sensors provided in the upper and lower systems, and a plurality of processors configured to execute one or more instructions to diagnose the steering angle alignment error between the steer-side upper system and wheel-side lower system on a basis of the information detected by the sensor unit and correct the steering angle alignment error in real time.

14 Claims, 4 Drawing Sheets

APPARATUS AND METHOD OF DIAGNOSING AND CORRECTING STEERING ANGLE OF STEER-BY-WIRE STEERING SYSTEM

CROSS-REFERENCE TO RELATED APPLICATION

This application claims the benefit under 35 USC § 119(a) of Korean Patent Application No. 10-2022-0068667, filed on Jun. 7, 2022, the entire disclosure of which is incorporated herein by reference for all purposes.

BACKGROUND

Field

Exemplary embodiments of the present disclosure relate to an apparatus and method of diagnosing and correcting a steering angle of a steer-by-wire steering system and, more particularly, to an apparatus and method of diagnosing and correcting a steering angle of a steer-by-wire (SBW) steering system by diagnosing an alignment error of a steering angle between an upper system (steer-side system) and a lower system (wheel-side system) in the SBW steering system and correcting the same in real time.

Description of the Related Art

In general, a power steering apparatus (or system) of a vehicle has been developed and applied to provide convenience in driving operation by assisting a driver's operating force of steering wheels. The developed power steering system includes a hydraulic type using hydraulic pressure, an electro-hydraulic type using hydraulic pressure and electric power of a motor at the same time, and an electric type using only electric power of a motor.

Recently, instead of removing a mechanical connection device such as a steering column, a universal joint, or a pinion shaft between a steering wheel and driving wheels (i.e., the driving wheels of a vehicle), a steer-by-wire (SBW) type steering system (or steer-by-wire steering system) that uses an electric motor such as a motor to steer a vehicle has been developed and applied.

This steer-by-wire steering system is a steering system in which a mechanical connection between a steering wheel and a front wheel steering system (that is, a rack to which the driving wheels are connected) is separated such that a rotation signal of the steering wheel is input from an electronic control unit (ECU) via a communication line (e.g., Direct CAN) and a steering motor connected to the rack is operated based on the input steering wheel rotation signal to steer a vehicle.

Therefore, in the SBW steering system, two systems (that is, an upper system (steer-side system) and a lower system (wheel-side system)) are connected and controlled by wire without H/W connection, so that the position control between the two systems (that is, steering angle alignment) is important.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, here is provided a steering angle diagnosis and correction apparatus in a steer-by-wire (SBW) steering system, the apparatus including a sensor unit configured to detect information for diagnosing a steering angle alignment error between a steer-side upper system and a wheel-side lower system in the SBW steering system through a plurality of sensors provided in the steer-side upper system and wheel-side lower system and one or more processors configured to execute one or more instructions to diagnose the steering angle alignment error between the steer-side upper system and wheel-side lower system on a basis of the information detected by the sensor unit and correct the steering angle alignment error in real time.

The steering angle diagnosis and correction apparatus may further include instructions to detecting a steering angle range during vehicle steering, comparing the steering angle range with a steerable range, the steerable range including one of a mechanically designed steerable range or a steerable range set by software, and adjusting the steerable range by an excess amount of the steering angle range in a direction to correct the steering angle alignment error if the steering angle range exceeds the one of the mechanically designed steerable range or the steerable range set by software.

The steering angle diagnosis and correction apparatus may further include instructions to repeatedly adjusting the steerable range by a predetermined angle for safety during a correction of the steering angle alignment error and determining that the steering angle alignment error has been corrected if an entire steering angle range matches one of the mechanically designed steerable range or the steerable range set by software.

The instructions to diagnose may further include diagnosing whether the steering angle alignment error occurs when one of a first limit of the mechanically designed steerable range or a second limit of the steerable range set by software is recognized in one of a left direction or a right direction of either one of the steer-side upper system and wheel-side lower system and checking which of the first limit or the second limit was reached first, and the instructions to correct may include, in a first case in which the first limit was reached, when an excess torque occurs beyond the steering angle of the steer-side upper system in a state of reaching the first limit, commanding a wheel-side steering position to be shifted by a predetermined angle and shifting an alignment position of the steer-side upper system by the predetermined angle in an excess torque direction, the excess torque direction being a direction in which the excess torque has occurred, responsive to when a wheel-side steering angle is increased while a steer-side steering angle limit of a steer-side steering angle is maintained according to the commanding.

The steering angle diagnosis and correction apparatus may further include instructions for correcting the steering angle alignment error until the wheel-side steering angle is no longer increased while the steer-side steering angle limit is maintained.

The instructions to correct may also include, in a second case in which the second limit was reached first and when steer-side excess torque occurs beyond the steering angle of the wheel-side lower system in a state of reaching a wheel-side limit position, allowing the steer-side steering range to be shifted by a predetermined excess limit beyond the wheel-side limit position and shifting the alignment position of the steer-side upper system by the predetermined excess limit when the steer-side steering angle is increased while a limit of the wheel-side steering angle is maintained.

The predetermined excess limit for the steer-side steering range may be allowed in one of a proportion to a time for which the steer-side excess torque is maintained or by a predetermined angle whenever the steer-side excess torque occurs again in a same direction after the steer-side excess torque is released.

The instructions to correct may also include correcting the steering angle alignment error until the steer-side steering angle is no longer increased while the limit of the wheel-side steering angle is maintained.

In another general aspect, here is provided a steering angle diagnosis and correction method in a steer-by-wire (SBW) steering system, the method including detecting, by a processor, information for diagnosing a steering angle alignment error between a steer-side upper system and a wheel-side lower system in the SBW steering system through a plurality of sensors provided in the steer-side upper system and wheel-side lower system and diagnosing and correcting, by the processor, the steering angle alignment error between the steer-side upper system and wheel-side lower system in real time on a basis of the information detected by the plurality of sensors.

In the diagnosing and correcting of the steering angle alignment error between the steer-side upper system and wheel-side lower system, the processor may be conjured to further detect a steering angle range during vehicle steering, compare the steering angle range with a mechanically designed steerable range or a steerable range set by software, and, if the detected steering angle range exceeds the mechanically designed steerable range or the steerable range set by software, adjust the steerable range by an excess amount for a direction and an angle to correct the steering angle alignment error.

In the correction of the steering angle alignment error, the processor may be configured to repeatedly adjust the steerable range by a predetermined amount for safety upon the correction of the steering angle alignment error and, if an entire detected steering angle range matches the mechanically designed steerable range or the steerable range set by software, determine that the steering angle alignment error has been corrected.

In the correction of the steering angle alignment error, the processor may be configured to diagnose an occurrence of the steering angle alignment error when a limit of the mechanically designed steerable range or the steerable range set by software is recognized in a left or right direction of the steer-side upper system and wheel-side lower system and the steerable range is reduced, correct the steering angle alignment error by checking which system has reached the limit first, and, in a case the checked system is the steer-side upper system, when excess torque occurs beyond the steering angle of the steer-side upper system in a state of reaching the limit, commanding a wheel-side steering position to be shifted by a predetermined amount. When a wheel-side steering angle is increased while the limit of a steer-side steering angle may be maintained according to the command, shifting an alignment position of the steer-side upper system by the predetermined amount in a direction in which the excess torque has occurred.

The steering angle diagnosis and correction method can have the processor be configured to correct the steering angle alignment error until the wheel-side steering angle is no longer increased while the limit of the steer-side steering angle is maintained.

In the correction of the steering angle alignment error, when the system that has reached the limit first is the wheel-side lower system, the processor may be configured to correct the steering angle alignment error by, when steer-side excess torque occurs beyond the steering angle of the wheel-side lower system in a state of reaching the limit, allowing the steer-side steering range to be shifted by a predetermined excess limit beyond a wheel-side limit position, and, when the steer-side steering angle is increased while the limit of the wheel-side steering angle is maintained, shifting the alignment position of the steer-side upper system by the allowed predetermined steer-side excess limit.

The steer-side excess limit for the steer-side steering range may be allowed in proportion to a time for which the steer-side excess torque is maintained, or is allowed by a predetermined angle whenever the steer-side excess torque occurs again in a same direction after the steer-side excess torque is released.

In the correction of the steering angle alignment error, the processor may be configured to correct the steering angle alignment error until the steer-side steering angle is no longer increased while the limit of the wheel-side steering angle is maintained.

Other features and aspects will be apparent from the following detailed description, the drawings, and the claims.

Figure 1:
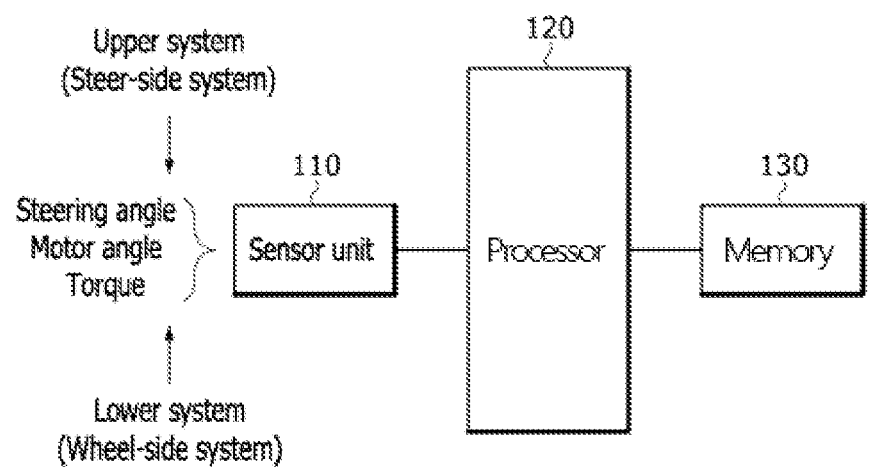
FIG. 1 is an exemplary diagram illustrating a schematic configuration of a steering angle diagnosis and correction apparatus in a steer-by-wire steering system according to an embodiment of the present disclosure.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Advantages and features of the present disclosure and methods of achieving the advantages and features will be clear with reference to embodiments described in detail below together with the accompanying drawings. However, the present disclosure is not limited to the embodiments disclosed herein but will be implemented in various forms. The embodiments of the present disclosure are provided so that the present disclosure is completely disclosed, and a person with ordinary skill in the art can fully understand the scope of the present disclosure. The present disclosure will be defined only by the scope of the appended claims. Meanwhile, the terms used in the present specification are for explaining the embodiments, not for limiting the present disclosure.

Terms, such as first, second, A, B, (a), (b) or the like, may be used herein to describe components. Each of these terminologies is not used to define an essence, order or sequence of a corresponding component but used merely to distinguish the corresponding component from other component(s). For example, a first component may be referred to as a second component, and similarly the second component may also be referred to as the first component.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween.

In a description of the embodiment, in a case in which any one element is described as being formed on or under another element, such a description includes both a case in which the two elements are formed in direct contact with each other and a case in which the two elements are in indirect contact with each other with one or more other elements interposed between the two elements. In addition, when one element is described as being formed on or under another element, such a description may include a case in which the one element is formed at an upper side or a lower side with respect to another element. \

The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

FIG. 1 is an exemplary diagram illustrating a schematic configuration of a steering angle diagnosis and correction apparatus in a steer-by-wire steering system according to an embodiment of the present disclosure.

As illustrated in FIG. 1, the steering angle diagnosis and correction apparatus in the steer-by-wire steering system (i.e., the SBW steering system) according to the present embodiment includes a sensor unit 110, a Processor 120, and a memory 130 (or memory).

The sensor unit 110 detects specified information (e.g., steering angle, motor angle, torque, etc.) from a plurality of sensors (not shown) provided in two systems (i.e., upper system and lower system) of the SBW steering system.

The Processor 120 diagnoses and corrects in real time a steering angle alignment error (i.e., the misaligned direction and angle of the steering angle) between the two systems (i.e., the upper system and the lower system) on the basis of specified information (e.g., steering angle, motor angle, torque, etc.) detected through the sensor unit 110.

The memory 130 stores a correction value of the steering angle alignment error (i.e., the misaligned direction and angle of the steering angle) between the two systems (i.e., the upper system and the lower system) diagnosed by the Processor 120.

Hereinafter, a method with which the Processor 120 diagnoses and corrects in real time a steering angle alignment error (i.e., the misaligned direction and angle of the steering angle) between two systems (i.e., upper system and lower system) will be described.

Figure 2:
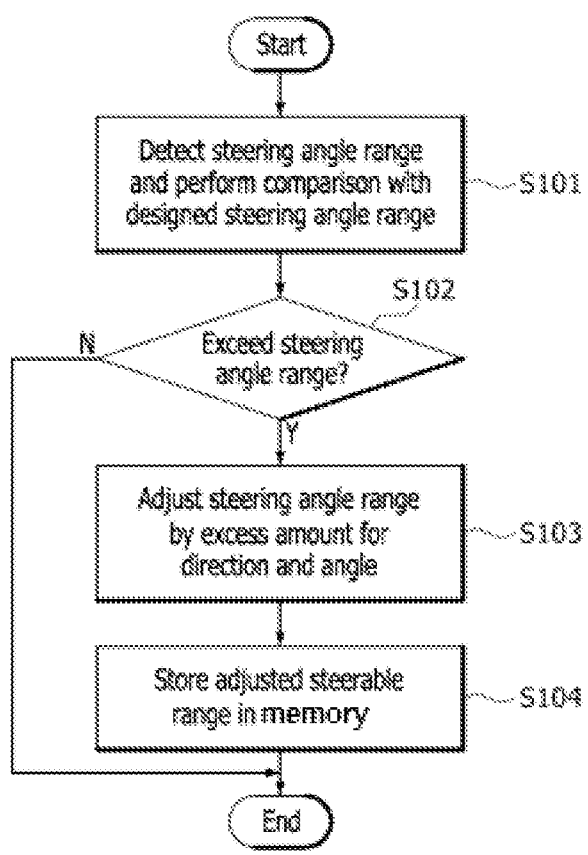
FIG. 2 is a flowchart illustrating a steering angle alignment error diagnosis and correction method according to a first embodiment of the present disclosure.

FIG. 2 is a flowchart illustrating a steering angle alignment error diagnosis and correction method according to a first embodiment of the present disclosure. In the flowchart, a method of diagnosing and correcting in real time a steering angle alignment error (i.e., the misaligned direction and angle of the steering angle) in a single system (i.e., one of two systems in a SBW steering system) will be described.

For example, in a single system (i.e., one of two systems of a SBW steering system), a steering angle alignment error (i.e., the misaligned direction and angle of the steering angle) may be diagnosed and corrected through a comparison between the entire detected steering angle range and a predesigned steering angle range.

For reference, if values of a plurality of steering angle sensors provided in the single system (i.e., one of the two systems of the SBW steering system) are different, an average value of the values of the steering angle sensors may be used.

Referring to FIG. 2, the Processor 120 is configured to detect a steering angle range during driver's vehicle steering and compare the steering angle range with a mechanically designed steerable range or a steerable range set by software (S101), and if the detected steering angle range exceeds the mechanically designed steerable range or the steerable range set by software (YES in S102), adjust the steerable range by an excess amount (i.e., an excess amount for a direction and an angle) to correct the steering angle alignment error (S103).

For example, assuming that the mechanically designed steerable range is ±500 degrees, the detected right limit is +600 degrees, and the detected left limit is −400 degrees, the steering angle alignment error may be corrected through a midpoint shift of the steering angle by adjusting the steering angle range by the excess amount of the mechanically designed steerable range (i.e., the excess amount for a direction and an angle) (e.g., ±100 degrees) in the corresponding direction (e.g., adjusting (shifting) the right limit of the steerable range by −100 degrees, or adjusting (shifting) the left limit of the steerable range by +100 degrees).

At this time, the steering angle alignment error may be repeatedly diagnosed and corrected gradually for safety (i.e., by a predetermined angle so as not to affect safety), and when the entire detected steering angle range matches the mechanically designed steerable range, or the steerable range set by software, the Processor 120 determines that the steering angle alignment error has been corrected, and stores the corrected value in the memory 130 (S104).

Figure 3:
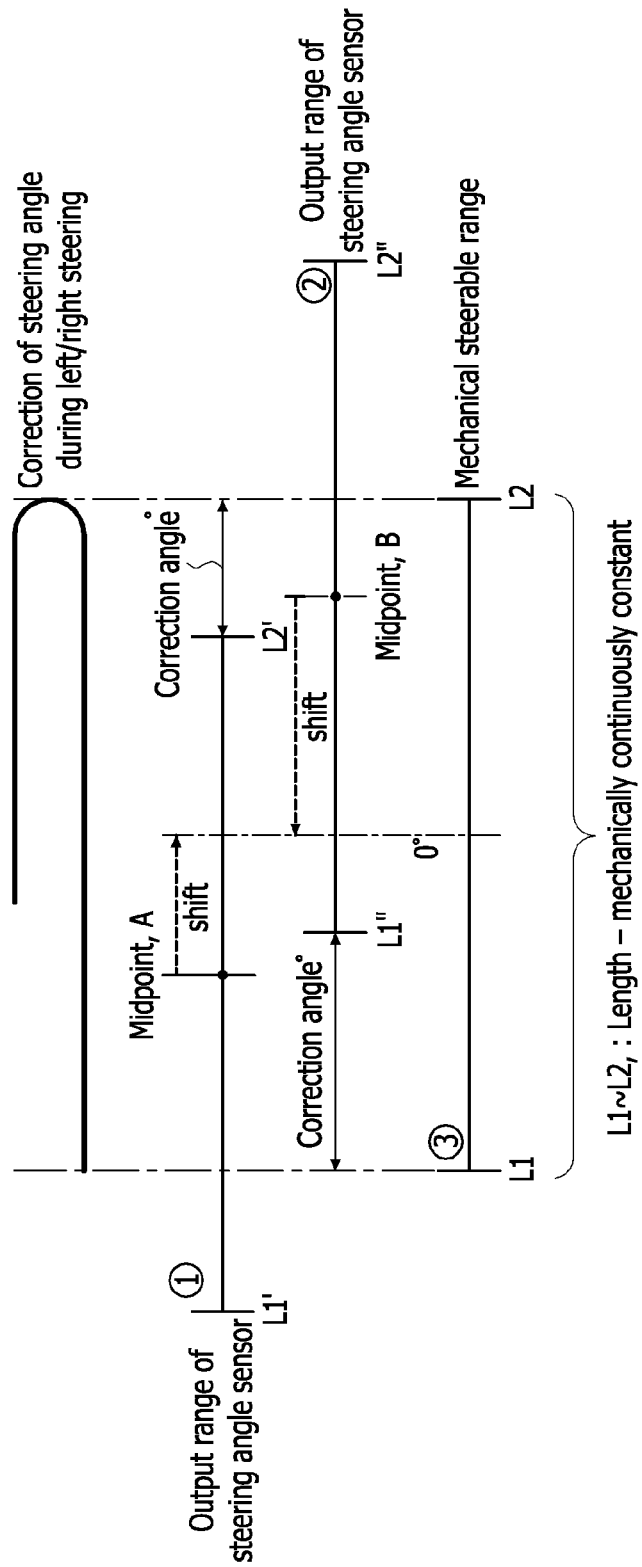
FIG. 3 is an exemplary diagram illustrating a steering angle alignment error diagnosis and correction method according to a second embodiment of the present disclosure.
Figure 4:
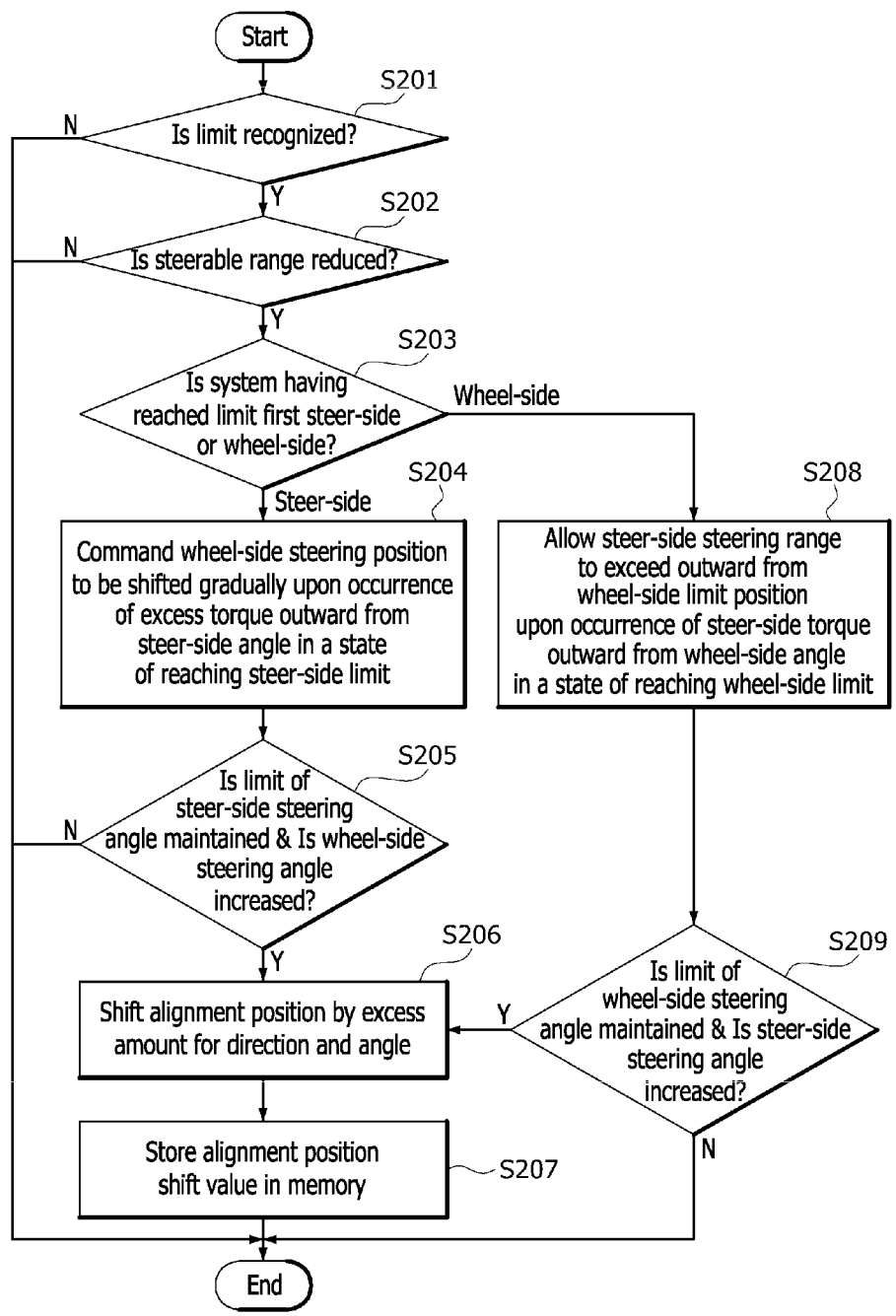
FIG. 4 is a flowchart illustrating the steering angle alignment error diagnosis and correction method in FIG. 3.

FIG. 3 is an exemplary diagram illustrating a steering angle alignment error diagnosis and correction method according to a second embodiment of the present disclosure, whereby the steering angle alignment error is diagnosed on the basis of the steering angles between two systems (the upper system and the lower system of the SBW steering system) and corrected in real time. FIG. 4 is a flowchart illustrating the steering angle alignment error diagnosis and correction method in FIG. 3.

Referring to FIG. 3, ① assumes that an output range of a value output from a steering angle sensor of the upper system of the two systems (i.e., the upper system and the lower system) of the SBW steering system is skewed to the left, ② assumes that an output range of a value output from a steering angle sensor of the upper system of the two systems (i.e., the upper system and the lower system) of the SBW steering system is skewed to the right, and ③ shows an output range of a value output from a steering angle sensor of the lower system of the two systems (i.e., the upper system and the lower system) of the SBW steering system.

For convenience, this embodiment describes a method of diagnosing and correcting a steering angle alignment error occurring in the upper system on the basis of the output range of the value output from the steering angle sensor of the lower system.

First, comparing ① and ③, in the alignment error situation as in ①, the steering wheel of the upper system has already reached the mechanical limit in the right direction, so the steering wheel cannot rotate any more. That is, while the driving wheel of the lower system can be further steered in the right direction as in ③, the steering wheel of the upper system cannot rotate to the right any more. On the other hand, while the steering wheel of the upper system can be further steered in the left direction as in ①, the driving wheel of the lower system first reaches the mechanical limit in the left direction as in ③, so due to the reaction force generated at this time, the steering wheel of the upper system cannot also rotate to the left any more.

On the other hand, comparing ② and ③, in the alignment error situation as in ②, the steering wheel of the upper system has already reached the mechanical limit in the left direction, so the steering wheel cannot rotate any more. That is, while the driving wheel of the lower system can be further steered in the left direction as in ③, the steering wheel of the upper system cannot rotate to the left any more. On the other hand, while the steering wheel of the upper system can be further steered in the right direction as in ②, the driving wheel of the lower system first reaches the mechanical limit in the right direction as in ③, so due to the reaction force generated at this time, the steering wheel of the upper system cannot also rotate to the right any more.

Therefore, since ① and ② are only opposite in the direction of the alignment error situation, the steering angle alignment error diagnosis method may be applied identically by changing the direction only.

In addition, in order to diagnose and correct the steering angle alignment error, a driver may check whether a steerable range is reduced by manually (i.e., manually by the driver) or automatically (i.e., automatically by a motor) steering a steering wheel from one limit (e.g., left) end to the other limit (e.g., right) and diagnosing a steering angle alignment error on the basis of detected information about the limit.

Referring to FIG. 4, when the mechanical limit of the steering range or the limit of the steering range set by software is recognized in the left or right direction of the two systems (the steer-side upper system and the wheel-side lower system) of the SBW steering system (YES in S201) and the steerable range is reduced (YES in S202), the Processor 120 diagnoses that a steering angle alignment error has occurred and, in order to correct the steering angle alignment error in real time, checks whether the system that has reaches the limit first is the steer-side upper system or the wheel-side lower system (S203).

For reference, the above two systems (the steer-side upper system and the wheel-side lower system) can know the steerable range and the left and right limit positions on the basis of the already known mechanically-designed value information. Alternatively, the limit can be recognized due to characteristics (phenomenon) that occur in the event of reaching the mechanical left and right limits. Otherwise, the limit can also be recognized by using a steering angle, a steering angular velocity, a motor angle, a motor angular velocity position information, column torque, and an output current.

Accordingly, if the system that has reaches the limit first is the steer-side upper system (steer-side of S203), when excess torque occurs beyond the steering-side steering angle in a state in which the steer-side reaches the limit (that is, when a driver who feels that a vehicle is not rotated as much as desired continues to rotate the steering wheel outward), the Processor 120 commands the wheel-side steering position to be shifted gradually (that is, by a predetermined angle so as not to affect safety) (S204).

According to the above command, if the wheel-side steering angle is increased while the limit of the steer-side steering angle is maintained (Yes in S205), this means that the steerable range of the steer-side upper system can be further increased (shifted) outward (i.e., outward from the limit of the steer-side steering direction) by the predetermined angle.

For example, assuming the steering angle alignment error situation as in ① of FIG. 3, in case a driver continues to rotate the steering wheel in the right direction while the steer-side reaches the right limit, when the Processor 120 commands the wheel-side steering position to be further shifted to the right by a specified angle (e.g., 2 degrees), and the wheel-side steering angle is increased (shifted) by the specified angle (e.g., 2 degrees) while the limit of the steer-side steering angle is maintained without being rotated further, this means that the steerable range of the steer-side upper system can be further increased (shifted) outward (i.e., to the right) by the specified angle (e.g., 2 degrees).

Accordingly, the Processor 120 moves (shifts) the alignment position of the steer-side upper system by the direction (i.e., excess direction) and angle diagnosed as being further movable (shiftable) (S206), and stores the alignment position movement (shift) value in the memory 130 (or memory) (S207).

This process can be repeated until the wheel-side steering angle is no longer increased while the limit of the steer-side steering angle is maintained.

On the other hand, if the system that has reached the limit first is the wheel-side lower system (wheel-side of S203), when steer-side torque occurs beyond the wheel-side steering angle (that is, when a driver who feels that the steering wheel has not been normally rotated to the limit continues to rotate the steering wheel outward) while the wheel-side lower system first reaches the limit, the Processor 120 allows the steer-side steering range to be shifted gradually (i.e., by a predetermined angle so as not to affect safety) outward from the wheel-side limit position (S208).

At this time, the excess limit for the steer-side steering range may be allowed in proportion to the time for which the steer-side excess torque is maintained (in this case, the excess limit can be limited, since a driver can feel that the steering wheel is idling), or may be allowed gradually (i.e., by a predetermined angle so as not to affect safety) whenever the steer-side excess torque occurs again in the same direction after the steer-side excess torque is released.

With the above allowance (that is, allowing the steer-side steering range to exceed the specified angle gradually outward from the wheel-side limit position), when the steer-side steering angle is increased while the limit of the wheel-side steering angle is maintained (YES in S209), this means that the mechanical steerable range of the steer-side upper system can be further increased (shifted) outward (i.e., outward from the limit of the steer-side steering direction).

Accordingly, the Processor 120 moves (shifts) the alignment position of the steer-side upper system by the direction (i.e., allowed steering direction of the steering wheel) and angle diagnosed as being further movable (shiftable) (S206), and stores the alignment position movement (shift) value in the memory 130 (or memory) (S207).

This process can be repeated until the steer-side steering angle is no longer increased while the limit of the wheel-side steering angle is maintained.

As described above, the present embodiment has the effect of diagnosing and correcting in real time the steering angle alignment error of the upper system (steer-side system) and the lower system (wheel-side system) in the SBW steering system.

However, in case the steering angle between the two systems is not aligned due to various causes, even if a steering angle sensor is abnormal (e.g., if an error has occurred in the steering angle sensor), there is a need for technology to enable diagnosis of the steering angle alignment error (i.e., the misaligned direction and angle of the steering angle) and real-time correction thereof.

The present disclosure has been made in an effort to solve problems in the related art, and the present disclosure is directed to a method and apparatus for controlling a vehicle rear collision warning capable of determining a reference overall length of a target vehicle based on a first overall length calculated based on a distance between a position of a reference point at a second time point and a position of a tracking point at the second time point for the target vehicle and a second overall length calculated based on a distance between a position of the reference point at a third time point and a position of the tracking point at the third time point for the target vehicle, and determining the reference position of the target vehicle at the third time point based on a difference between the first overall length and the second overall length.

The present disclosure has also been made to implement a vehicle rear collision warning capable of increasing accuracy of position transition of the tracking point, and reduce or eliminate errors in tracking a target vehicle and malfunctioning of a collision warning. The system may reduce or eliminate tracking errors in instances in which the target vehicle has a different radar cross section (RCS) depending on the position of the target vehicle or the target vehicle includes a discontinuous shape such as a trailer connection. The system thereby avoids a tracking error of the radar sensor and creating tracking points of wrong positions. Additionally, the system may eliminate or reduce malfunctions such as early cancellation of the collision warning or irregular suspension of the collision warning.

Various embodiments of the present disclosure do not list all available combinations but are for describing a representative aspect of the present disclosure, and descriptions of various embodiments may be applied independently or may be applied through a combination of two or more.

Moreover, various embodiments of the present disclosure may be implemented with hardware, firmware, software, or a combination thereof. In a case where various embodiments of the present disclosure are implemented with hardware, various embodiments of the present disclosure may be implemented with one or more application specific integrated circuits (ASICs), digital signal processors (DSPs), digital signal processing devices (DSPDs), programmable logic devices (PLDs), field programmable gate arrays (FPGAs), general processors, controllers, microcontrollers, or microprocessors.

The scope of the present disclosure may include software or machine-executable instructions (for example, an operation system (OS), applications, firmware, programs, etc.), which enable operations of a method according to various embodiments to be executed in a device or a computer, and a non-transitory computer-readable medium capable of being executed in a device or a computer each storing the software or the instructions.

A number of embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A steering angle diagnosis and correction apparatus in a steer-by-wire (SBW) steering system, the apparatus comprising:
    a sensor unit configured to detect information for diagnosing a steering angle alignment error between a steer-side upper system and a wheel-side lower system in the SBW steering system through a plurality of sensors provided in the steer-side upper system and wheel-side lower system; and
    one or more processors configured to execute one or more instructions to:
    diagnose the steering angle alignment error between the steer-side upper system and wheel-side lower system on a basis of the information detected by the sensor unit; and
    correct the steering angle alignment error in real time, wherein the instructions further comprise:
    detecting a steering angle range during vehicle steering;

comparing the steering angle range with a steerable range, the steerable range including one of a mechanically designed steerable range or a steerable range set by software; and adjusting the steerable range by an excess amount of the steering angle range in a direction to correct the steering angle alignment error if the steering angle range exceeds the one of the mechanically designed steerable range or the steerable range set by software.

2. The steering angle diagnosis and correction apparatus according to claim 1, wherein the instructions further comprise:
repeatedly adjusting the steerable range by a predetermined angle for safety during a correction of the steering angle alignment error; and
determining that the steering angle alignment error has been corrected if an entire steering angle range matches one of the mechanically designed steerable range or the steerable range set by software.

3. The steering angle diagnosis and correction apparatus according to claim 1, wherein the instructions to diagnose further comprise:
diagnosing whether the steering angle alignment error occurs when one of a first limit of the mechanically designed steerable range or a second limit of the steerable range set by software is recognized in one of a left direction or a right direction of either one of the steer-side upper system and wheel-side lower system; and
checking which of the first limit or the second limit was reached first, and
wherein the instructions to correct further comprise:
in a first case in which the first limit was reached, when an excess torque occurs beyond the steering angle of the steer-side upper system in a state of reaching the first limit, commanding a wheel-side steering position to be shifted by a predetermined angle; and
shifting an alignment position of the steer-side upper system by the predetermined angle in an excess torque direction, the excess torque direction being a direction in which the excess torque has occurred, responsive to when a wheel-side steering angle is increased while a steer-side steering angle limit of a steer-side steering angle is maintained according to the commanding.

4. The steering angle diagnosis and correction apparatus according to claim 3, wherein the instructions further comprise correcting the steering angle alignment error until the wheel-side steering angle is no longer increased while the steer-side steering angle limit is maintained.

5. The steering angle diagnosis and correction apparatus according to claim 3, wherein the instructions to correct further comprise:
in a second case in which the second limit was reached first and when steer-side excess torque occurs beyond the steering angle of the wheel-side lower system in a state of reaching a wheel-side limit position, allowing the steer-side steering range to be shifted by a predetermined excess limit beyond the wheel-side limit position; and
shifting the alignment position of the steer-side upper system by the predetermined excess limit when the steer-side steering angle is increased while a limit of the wheel-side steering angle is maintained.

6. The steering angle diagnosis and correction apparatus according to claim 5, wherein the predetermined excess limit for the steer-side steering range is allowed in one of a proportion to a time for which the steer-side excess torque is maintained or by a predetermined angle whenever the steer-side excess torque occurs again in a same direction after the steer-side excess torque is released.

7. The steering angle diagnosis and correction apparatus according to claim 5, wherein the instructions to correct further comprise correcting the steering angle alignment error until the steer-side steering angle is no longer increased while the limit of the wheel-side steering angle is maintained.

8. A steering angle diagnosis and correction method in a steer-by-wire (SBW) steering system, the method comprising:
detecting, by a processor, information for diagnosing a steering angle alignment error between a steer-side upper system and a wheel-side lower system in the SBW steering system through a plurality of sensors provided in the steer-side upper system and wheel-side lower system; and
diagnosing and correcting, by the processor, the steering angle alignment error between the steer-side upper system and wheel-side lower system in real time on a basis of the information detected by the plurality of sensors,
wherein, in the diagnosing and correcting of the steering angle alignment error between the steer-side upper system and wheel-side lower system, the processor is configured to:
detect a steering angle range during vehicle steering;
compare the steering angle range with a mechanically designed steerable range or a steerable range sel by software; and
if the detected steering angle range exceeds the mechanically designed steerable range or the steerable range set by software, adjust the steerable range by an excess amount for a direction and an angle to correct the steering angle alignment error.

9. The steering angle diagnosis and correction method according to claim 8, wherein in the correction of the steering angle alignment error, the processor is configured to:
repeatedly adjust the steerable range by a predetermined amount for safety upon the correction of the steering angle alignment error; and
if an entire detected steering angle range matches the mechanically designed steerable range or the steerable range set by software, determine that the steering angle alignment error has been corrected.

10. The steering angle diagnosis and correction method according to claim 8, wherein in the correction of the steering angle alignment error, the processor is configured to
diagnose an occurrence of the steering angle alignment error when a limit of the mechanically designed steerable range or the steerable range set by software is recognized in a left or right direction of the steer-side upper system and wheel-side lower system and the steerable range is reduced;
correct the steering angle alignment error by checking which system has reached the limit first; and
in a case the checked system is the steer-side upper system, when excess torque occurs beyond the steering angle of the steer-side upper system in a state of reaching the limit, commanding a wheel-side steering position to be shifted by a predetermined amount; and
when a wheel-side steering angle is increased while the limit of a steer-side steering angle is maintained according to the command, shifting an alignment position of the steer-side upper system by the predetermined amount in a direction in which the excess torque has occurred.

11. The steering angle diagnosis and correction method according to claim 10, wherein the processor is configured to correct the steering angle alignment error until the wheel-side steering angle is no longer increased while the limit of the steer-side steering angle is maintained.

12. The steering angle diagnosis and correction method according to claim 10, wherein in the correction of the steering angle alignment error, when the system that has reached the limit first is the wheel-side lower system, the processor is configured to:

correct the steering angle alignment error by, when steer-side excess torque occurs beyond the steering angle of the wheel-side lower system in a state of reaching the limit, allowing the steer-side steering range to be shifted by a predetermined excess limit beyond a wheel-side limit position; and when the steer-side steering angle is increased while the limit of the wheel-side steering angle is maintained, shifting the alignment position of the steer-side upper system by the allowed predetermined steer-side excess limit.

13. The steering angle diagnosis and correction method according to claim 12, wherein the steer-side excess limit for the steer-side steering range is allowed in proportion to a time for which the steer-side excess torque is maintained, or is allowed by a predetermined angle whenever the steer-side excess torque occurs again in a same direction after the steer-side excess torque is released.

14. The steering angle diagnosis and correction method according to claim 12, wherein in the correction of the steering angle alignment error, the processor is configured to correct the steering angle alignment error until the steer-side steering angle is no longer increased while the limit of the wheel-side steering angle is maintained.

* * * * *